Jan. 17, 1933.  L. A. HYLAND  1,894,687
PIEZO ELECTRIC CRYSTAL TEMPERATURE CONTROL
Filed Dec. 8, 1930
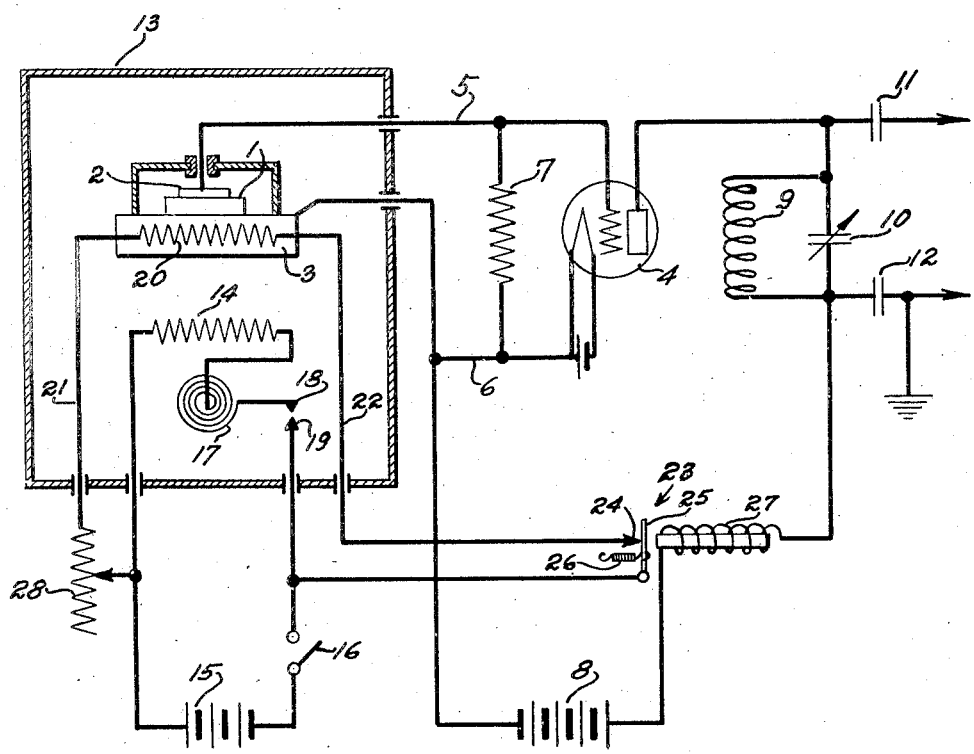
INVENTOR
*Lawrence A. Hyland.*
BY
ATTORNEY Patented Jan. 17, 1933

1,894,687

UNITED STATES PATENT OFFICE

LAWRENCE A. HYLAND, OF WASHINGTON, DISTRICT OF COLUMBIA, ASSIGNOR TO ECLIPSE AVIATION CORPORATION, OF EAST ORANGE, NEW JERSEY, A CORPORATION OF NEW JERSEY

PIEZO-ELECTRIC CRYSTAL TEMPERATURE CONTROL

Application filed December 8, 1930. Serial No. 500,838.

(GRANTED UNDER THE ACT OF MARCH 3, 1883, AS AMENDED APRIL 30, 1928; 370 O. G. 757)

The present invention relates to frequency control systems, and more particularly to means for controlling the temperature of a frequency control or stabilizing device.

It is well known in the radio art that for precise control of frequencies in a transmitter wherein quartz crystals are employed as the master control, it is very essential that the crystal be maintained at a constant temperature. Various ways and means have heretofore been employed for maintaining the temperature of the medium surrounding the crystal at some predetermined fixed value, as for example, by placing the crystal, with its mounting, in a constant-temperature cabinet provided with a thermostatically controlled heater. It has been found, however, that where a strongly oscillating piezo-electric crystal is employed, it is insufficient merely to maintain a constant temperature of the medium surrounding the crystal, because the crystal itself generates a considerable amount of heat, and this heat changes the frequency of the crystal between the time the crystal is initially put into oscillation and the time that it reaches a substantially stable temperature. For example, in certain types of accurately controlled constant-temperature cabinets, the actual temperature of the crystal when oscillating has been found to be three degrees above the temperature in the non-oscillating condition.

Since the crystal, with its holder, has considerable mass, and since there must be a finite distance between the crystal, the thermostat, and the heater, there is in the general case, the possibility of several degrees difference in the crystal temperature between the non-oscillating and the oscillating condition of the crystal. Moreover, the change in temperature within the constant-temperature cabinet due to the oscillation of the crystal does not take place instantaneously, but occurs gradually and extends over a considerable period of time. Hence, the temperature control systems heretofore used required that the control system and the crystal controlled transmitting vacuum tube be placed in operation at least an hour, and sometimes longer, before the transmitter is to be used.

It is therefore one of the objects of the present invention to provide a novel temperature control system whereby the above disadvantages and the necessity for setting the vacuum tube of the system into oscillation a long period before operation of the transmitter is eliminated, thus economizing in power, reducing deterioration of the crystal due to operation to a minimum, and providing accurate frequency control.

Another object is to provide in a radio circuit embodying a frequency control device, novel means for controlling the temperature of said device whereby the latter is maintained at constant temperature regardless of whether the device is in operation or not.

Another object is to provide a novel temperature control system of the above type embodying means whereby heat is supplied to said device when the latter is not operating so as to maintain the temperature thereof the same as when operating.

Another object is to provide novel temperature control apparatus for a frequency control device embodying temperature-responsive means for maintaining the medium surrounding said device at constant temperature and auxiliary heating means adapted to be rendered effective upon cessation of operation of said device for maintaining the latter at constant temperature.

Still another object is to provide in a crystal-controlled vacuum tube transmitting system, novel means for maintaining the temperature of the piezo-electric crystal at substantially the same value in a non-oscillating condition as in an oscillating condition, and including means responsive to flow of plate current of the vacuum tube of the transmitting system.

A still further object is to provide in a crystal-controlled vacuum tube transmitting system, novel means whereby heat is supplied to the piezo-electric crystal when the latter is not oscillating, in an amount substantially equal to the heat generated by said crystal when it is oscillating, and including means operative upon the flow of plate current for rendering said first mentioned means inoperative.

The above and other objects and advantages of the invention will appear more fully hereinafter from a consideration of the detailed description which follows, taken together with the accompanying drawing, wherein is illustrated one embodiment of the invention. It is to be expressly understood, however, that the drawing is for the purpose of illustration only, and is not designed as a definition of the limits of the invention.

The single figure of the drawing is a schematic circuit diagram illustrating one arrangement of the control system embodying the present invention.

Referring to the drawing, the system and apparatus disclosed therein comprise the usual quartz crystal 1 arranged to oscillate between the plates or electrodes 2 and 3 which are connected to the grid-filament circuit of the vacuum tube 4 by means of leads 5 and 6. A high resistor 7 is shunted between the grid and filament for providing the necessary bias to the grid of the vacuum tube. Positive potential is supplied to the plate of the vacuum tube in the usual manner from a direct-current supply as, for example, the battery 8, and the output circuit of the tube includes a tuned circuit comprising inductance 9 and variable capacity 10 by means of which the circuit may be tuned to any selected frequency. By-pass condensers 11 and 12 are interposed in the output leads to isolate the D. C. plate current from the following grid and ground respectively.

It is desirable that the frequency of the piezo-electric crystal remain substantially unchanged, and to this end means are provided for maintaining the temperature of the medium surrounding the crystal constant, which comprises a constant-temperature cabinet 13 within which are located the crystal and an electric heater element 14 adapted to be energized from the source of current 15 when switch 16 is closed. In series with the heater element 14 there is provided a temperature-responsive switch 17 having contacts 18 and 19 which are normally closed but which are adapted to be opened upon a rise in temperature in the cabinet 13. In this manner the air within the cabinet is maintained at a constant temperature. However, when the crystal begins to oscillate, additional heat is generated by the crystal and the temperature of the latter will be much greater after it has been oscillating over an extended period of time than when it first starts to oscillate. This will tend to change the natural frequency of the crystal due to the temperature change.

Means are therefore provided for maintaining the temperature of the crystal at the same temperature at the beginning of oscillation as when it has been oscillating for an extended period of time, and in the form shown, said means comprise a heater element 20 built into the lower plate or electrode 3 of the crystal holder and which is adapted to be energized from the source of current 15 through leads 21 and 22 when the switch 16 is closed.

It is essential, however, that the heater element 20 be energized only at such times as when the crystal is not oscillating and that it be de-energized when the crystal is in an oscillating condition. To this end there is provided an electro-magnetic switch 23 having fixed and movable contacts 24 and 25, respectively, which are normally held closed by means of a spring 26. When the crystal circuit begins to oscillate, plate-current begins to flow in the output circuit of the vacuum tube from the source 8, thereby energizing the coil 27 which is interposed in said plate circuit.

Energization of the coil 27 causes the attraction of the movable contact 25, thereby breaking the circuit of the heater element 20 and de-energization of the latter, so that generation of heat from the heater element ceases and generation of heat due to the oscillation of the crystal begins.

Means are also provided for adjusting the current flow through the heater element 20 whereby the amount of heat generated may be adjusted to substantially the same value as the heat generated by the crystal, said means being constituted by a rheostat 28 placed in series with the source 15 and heater element 20. In this manner the temperature of the crystal will be maintained constant inasmuch as heat is applied thereto from an external source in the same amount when it is not operating as the heat generated by the crystal itself when it is set into oscillation, the external source being adapted to be rendered inoperative when the crystal begins to oscillate, as pointed out above.

In operation the system works as follows: Switch 16 is first closed, thereby setting into operation the heater element 14 and its associated temperature-responsive element 17, by means of which the temperature within the cabinet 13 is maintained substantially constant. When the crystal and tube are not oscillating, no plate current is being drawn by the tube and hence contacts 24 and 25 are closed, thus permitting current to flow through heater element 20 as regulated by the rheostat 28. Lower electrode 3 and consequently the crystal are then kept at the same temperature as when the latter is oscillating. If, however, the vacuum tube and crystal start to oscillate, plate current flows through coil 27, which attracts the movable contact 25 away from the fixed contact 24 and interrupts the current flowing through the heater element 20. The crystal now begins to generate heat due to its own operation and is thereby kept at the same temperature as when the heater element 20 was in operation. As soon as the vacuum tube and the crystal cease oscillating, coil 27 becomes de-energized, contacts 24 and 25 are closed, and heater element 20 again begins to generate heat. In this manner the temperature within the cabinet 13 is maintained constant regardless of whether the crystal is oscillating or not, because when it is oscillating heat is supplied by the crystal, and when it is not oscillating the same amount of heat is supplied by the heater element.

If a different crystal be substituted between the plates 2 and 3, rheostat 28 is then adjusted so that the heat supplied to the crystal and holder in an non-oscillating condition will be exactly the same as that supplied by the crystal when oscillating.

There is thus provided a novel temperature-control system for a piezo-electric crystal whereby the frequency of the latter is maintained constant and hence an accurate predetermined frequency may be radiated by a transmitting system. There is also provided a novel combination whereby the crystal is maintained at the same temperature in the oscillating condition as when in the non-oscillating condition, whereby it is not necessary to start the operation of the vacuum tube for any period of time prior to actual transmission, as was required heretofore.

While only one embodiment of the invention has been illustrated, various changes and modifications, which will now appear to those skilled in the art, may be made therein without departing from the scope of the invention. For example, the control system may be employed in association with other types of frequency control or stabilizing devices, such as magneto-striction systems. Reference is therefore to be had to the appended claims for a definition of the limits of the invention.

The herein described invention may be manufactured and used by or for the Government of the United States for governmental purposes without the payment to me of any royalty thereon.

What is claimed is:

1. In a temperature regulating system for frequency control or stabilizing devices, means for mounting a frequency control or stabilizing device, and means for supplying heat to said device when the latter is not operating, in the same amount as the heat generated thereby when it is operating.

2. In combination with a frequency control device adapted to vibrate and generate heat when in vibration, a temperature-control system for said vibrating device including a constant-temperature cabinet having means therein for supplying heat, temperature-responsive means for maintaining the temperature in said cabinet constant, and auxiliary heating means for maintaining the temperature of the frequency control device at the same value when the latter is not vibrating as when it is vibrating whereby the frequency of the device remains constant.

3. In combination with a piezo-electric crystal adapted to generate heat by its operation, means adapted to be rendered operative upon cessation of operation of the crystal for maintaining the temperature of the latter at the same value when not in operation as when in operation whereby the frequency of the crystal remains constant.

4. In combination with a device adapted to generate heat by its operation, means adapted to be rendered operative upon cessation of operation of the device for maintaining the temperature of the latter at the same value when not in operation as when in operation, including means for supplying the same amount of heat to said device as the amount generated by the latter.

5. In combination with a frequency control device adapted to generate heat by its operation, means adapted to be rendered operative upon cessation of operation of the device for maintaining the temperature of the latter at the same value when in operation as when not in operation, including means for supplying the same amount of heat to said device as the amount generated by the latter.

6. In combination with a piezo-electric crystal adapted to generate heat by its operation, means adapted to be rendered operative upon cessation of operation of the crystal for maintaining the temperature of the latter at the same value when in operation as when not in operation, including means for supplying the same amount of heat to said device as the amount generated by the latter.

7. In combination with a signaling system, means for maintaining the transmitting frequency of said system constant, and a temperature regulating system for said frequency control means including means for maintaining the temperature of the medium surrounding said frequency control means constant, and means for supplying the same amount of heat to said frequency control means when the latter is inoperative as the amount generated thereby when in operation.

8. In combination with a signaling system, means for maintaining the transmitting frequency of said system constant, and a temperature regulating system for said frequency control means including means for maintaining the temperature of the medium surrounding said frequency control means constant, and means for supplying the same amount of heat to said frequency control means when the latter is inoperative as the amount generated thereby when in operation, said last mentioned means being rendered ineffective by the operation of said signaling system.

9. In combination with a vacuum tube signaling system, means for maintaining the transmitting frequency of said system constant, and a temperature regulating system for said frequency control means including means for maintaining the temperature of the medium surrounding said frequency control means constant, and means for supplying the same amount of heat to said frequency control means when the latter is inoperative as the amount generated thereby when in operation, said last mentioned means being rendered inoperative by the flow of plate current in the output circuit of said vacuum tube.

10. In combination with a signaling system, means for maintaining the transmission frequency of said system constant, and a temperature-regulating system for maintaining the temperature of said frequency control means constant, including means for heating the medium surrounding said frequency control means, temperature-responsive means for rendering said heating means operative and inoperative upon changes in temperature of said surrounding medium, means for supplying heat to said frequency control means when the latter is not operating, means for regulating the amount of heat generated by said last mentioned heating means to the same amount as is generated by said frequency control means when in operation, and means operative upon the operation of said signaling system for rendering said last mentioned heating means ineffective.

11. In combination with a vacuum tube signaling system, means for maintaining the transmission frequency of said system constant, and a temperature-regulating system for maintaining the temperature of said frequency control means constant, including means for heating the medium surrounding said frequency control means, temperature-responsive means for rendering said heating means operative and inoperative upon changes in temperature of said surrounding medium, means for supplying heat to said frequency control means when the latter is not operating, means for regulating the amount of heat generated by said last mentioned heating means to the same amount as is generated by said frequency control means when in operation, and means operative upon the flow of plate current in the output circuit of said vacuum tube for rendering said last mentioned means ineffective.

12. In combination with a vacuum tube signaling system, a piezo-electric crystal for maintaining the transmission frequency of said system constant, and a temperature regulating system for maintaining the temperature of the crystal at the same value when the latter is in a non-oscillating condition as when in an oscillating condition, including means for heating the medium surrounding said crystal, temperature-responsive means for rendering said heating means effective and ineffective in accordance with the temperature changes, auxiliary means for supplying heat to said crystal, means for adjusting said auxiliary heating means so that the same amount of heat is generated thereby as that which is generated by the crystal itself when it is in an oscillating condition, and means responsive to the flow of plate current in said vacuum tube for rendering said auxiliary heating means ineffective.

13. In combination with a piezo-electric crystal adapted to generate heat by its operation and having a support therefor, means for operating said crystal, a heater element associated with said support, a source of electrical energy for energizing said heater element, and means rendered effective by said crystal operating means for connecting the source to said heater element when the crystal is not operating, whereby the temperature of the crystal is maintained at the same value when it is not operating as when it is operating.

14. In combination with a piezo-electric crystal adapted to generate heat by its operation and having an electrode on each side thereof, an electrical circuit connected with said electrodes for operating said crystal, a resistance element carried by one of the electrodes for supplying heat thereto, a source of electrical energy for heating said resistance element, and a relay connected with the electrical circuit for connecting the source to said resistance element when the crystal is not operating and disconnecting said source when the crystal is operating.

15. In combination with a piezo-electric crystal adapted to generate heat by its operation and having an electrode on each side thereof, an electrical circuit connected with said electrodes for operating said crystal, a resistance element carried by one of the electrodes for supplying heat thereto, a source of electrical energy for heating said resistance element, a relay connected with the electrical circuit for connecting the source to said resistance element when the crystal is not operating and disconnecting said source when the crystal is operating, and a temperature regulated system for maintaining the temperature of the air surrounding the crystal constant.

16. In combination with a vacuum tube signaling system, a piezo-electric crystal for maintaining the transmitting frequency of said system constant, and a temperature regulating system for said piezo-electric system including a constant-temperature cabinet, temperature controlled heating means in said cabinet for maintaining the temperature of the medium surrounding said crystal constant, auxiliary heating means for supplying the same amount of heat to said crystal when the latter is inoperative as the amount generated thereby when in operation and means for rendering said auxiliary heating means inoperative by the flow of plate current in the output circuit of said vacuum tube.

17. In combination with a signaling system, a piezo-electric crystal for maintaining the transmission frequency of said system constant, and a temperature regulating system for maintaining the temperature of said crystal constant including a constant temperature cabinet enclosing said crystal, an electrical heating element for heating the air surrounding said crystal, a thermostat for rendering said heating element operative and inoperative upon changes in temperature of said surrounding air, a second electrical heating element for supplying heat to said crystal when the latter is not operating, a rheostat for regulating the amount of heat generated by said second heating element to the same amount as is generated by the crystal when the latter is in operation, and a relay rendered effective upon the operation of said signaling system for rendering said second heating element ineffective.

18. In combination with a vacuum tube signaling system, a piezo-electric crystal for maintaining the transmission frequency of said system constant and adapted to generate heat by its operation, and a temperature regulating system for maintainng the temperature of the crystal at the same value when the latter is in a non-oscillating condition as when in an oscillating condition including a constant temperature cabinet enclosing said crystal, an electrical heating element for heating the air surrounding said crystal, a thermostat for rendering said heating element effective and ineffective in accordance with temperature changes of the surrounding air, an auxiliary electrical heating element for supplying heat to said crystal, a rheostat for regulating the amount of heat generated by said second heating element to the same amount as is generated by the crystal when the latter is in an oscillating condition, a relay responsive to the flow of plate current in said vacuum tube for rendering said second heating element ineffective, and a switch for rendering both of said heating elements ineffective at will.

In testimony whereof I have signed this specification.

LAWRENCE A. HYLAND.